US008553507B1

(12) United States Patent
Tagawa et al.

(10) Patent No.: US 8,553,507 B1
(45) Date of Patent: Oct. 8, 2013

(54) WRITE TRACK SHIFT CONTROL IN SHINGLED-MICROWAVE-ASSISTED MAGNETIC RECORDING (MAMR-SMR)

(71) Applicant: HGST Netherlands B.V., Amsterdam (NL)

(72) Inventors: Ikuya Tagawa, Hiratsuka (JP); Masaomi Ikeda, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/675,836

(22) Filed: Nov. 13, 2012

(51) Int. Cl.
*G11B 11/00* (2006.01)
(52) U.S. Cl.
USPC ..................................... 369/13.33; 369/13.13
(58) Field of Classification Search
USPC .......... 369/13.33, 13.13, 13.32, 13.02, 13.17, 369/13.24; 360/59, 31, 55, 69
See application file for complete search history.

(56) References Cited

U.S. PATENT DOCUMENTS

| | | | |
|---|---|---|---|
| 8,027,110 B1 * | 9/2011 | Yamanaka et al. ............... 360/31 |
| 8,082,657 B2 | 12/2011 | Lee et al. |
| 8,094,399 B2 * | 1/2012 | Roppongi et al. ............... 360/55 |
| 8,125,723 B1 | 2/2012 | Nichols et al. |
| 8,264,916 B1 * | 9/2012 | Aoyama et al. ............. 369/13.13 |
| 2008/0019040 A1 * | 1/2008 | Zhu et al. ....................... 360/110 |
| 2009/0316304 A1 * | 12/2009 | Funayama et al. .......... 360/234.3 |
| 2010/0309577 A1 * | 12/2010 | Gao et al. ......................... 360/75 |
| 2011/0043943 A1 * | 2/2011 | Igarashi et al. ................. 360/59 |
| 2011/0090603 A1 | 4/2011 | Bai |
| 2011/0273800 A1 * | 11/2011 | Takano et al. ............. 360/125.12 |
| 2012/0033534 A1 * | 2/2012 | Yamanaka et al. ......... 369/13.24 |
| 2012/0060064 A1 | 3/2012 | Keidar-Barner et al. |
| 2012/0113542 A1 * | 5/2012 | Igarashi et al. ................. 360/75 |
| 2012/0147502 A1 * | 6/2012 | Udo et al. ................. 360/125.12 |
| 2012/0275061 A1 * | 11/2012 | Takagishi et al. ......... 360/123.05 |
| 2013/0050866 A1 * | 2/2013 | Matsubara et al. ............. 360/31 |

FOREIGN PATENT DOCUMENTS

| | | |
|---|---|---|
| KR | 2009/0100611 | 9/2009 |
| WO | 2011/109068 A1 | 9/2011 |

OTHER PUBLICATIONS

Zhu et al., "Microwave Assisted Magnetic Recording Utilizing Perpendicular Spin Torque Oscillator With Switchable Perpendicular Electrodes," 2010 IEEE, IEEE Transactions on Magnetics, vol. 46, No. 3, Mar. 2010, pp. 751-757.
Matsubara et al., "Experimental feasibility of spin-torque oscillator with synthetic field generation layer for microwave assisted magnetic recording," Journal of Applied Physics, vol. 109, 2011, 3 pages (abstract only).
Zhu et al., "Bias-Field-Free Microwave Oscillator Driven by Perpendicularly Polarized Spin Current," IEEE Transactions on Magnetics, Oct. 2006, vol. 42, Issue 10, pp. 2670-2672 (abstract only).

* cited by examiner

*Primary Examiner* — Tan X Dinh
(74) *Attorney, Agent, or Firm* — Zilka-Kotab, PC

(57) ABSTRACT

In one embodiment, a magnetic data storage system includes a magnetic disk medium, a microwave-assisted magnetic recording (MAMR) head including a main pole adapted for recording data to the magnetic disk medium having a first recording width, a spin torque oscillator (STO) adapted to apply a high-frequency magnetic field to the magnetic disk medium during a recording operation, wherein the STO is operable or inoperable when in an on or off state, respectively, wherein the main pole has a second recording width when the STO is in the on state, and the second recording width is different from the first recording width, a drive mechanism for passing the magnetic disk medium over the MAMR head, a read head including a magnetoresistance sensor, and a controller adapted for adjusting a shift quantity of the magnetic head depending on whether the STO is in the on or off state.

17 Claims, 9 Drawing Sheets

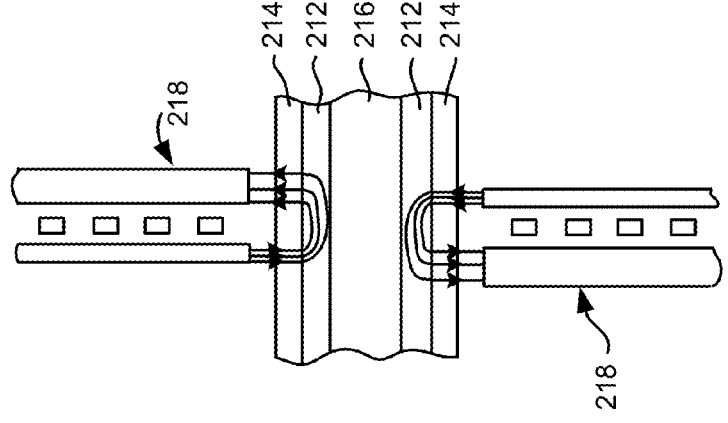
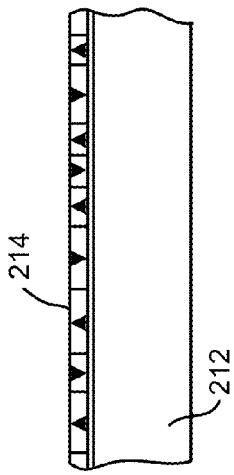
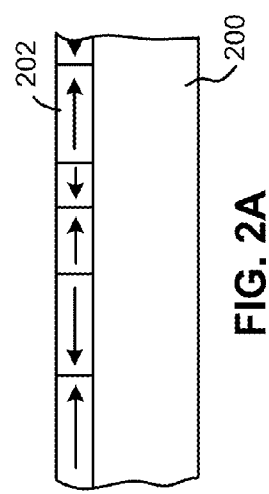
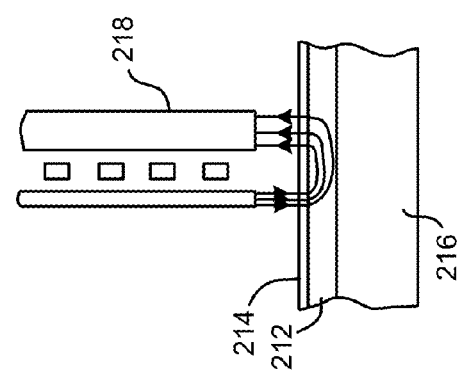
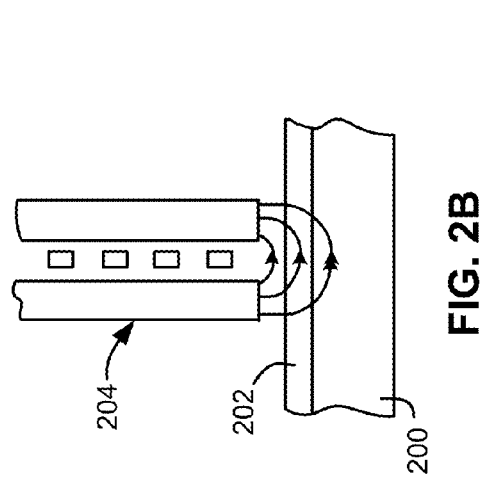

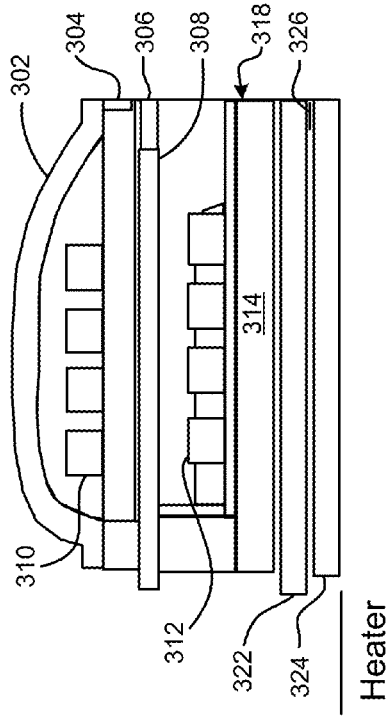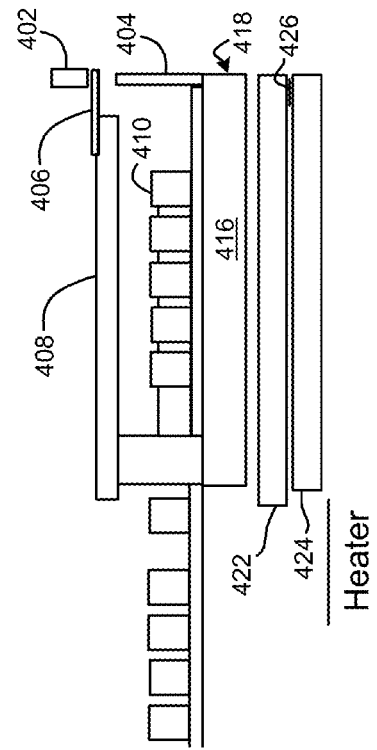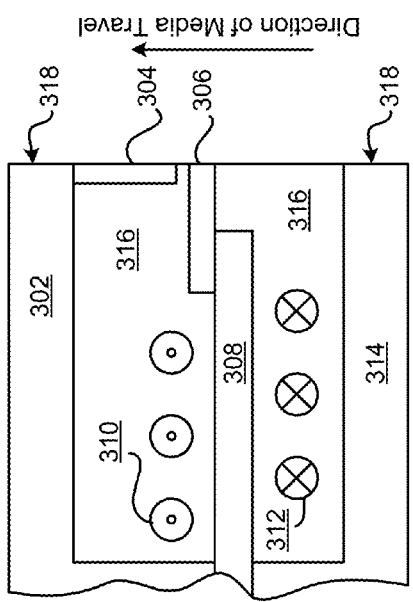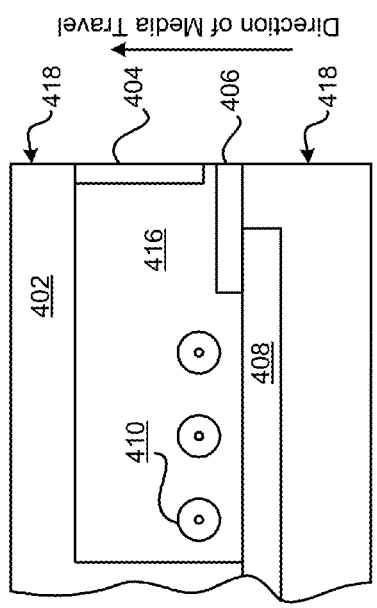

WRITE TRACK SHIFT CONTROL IN SHINGLED-MICROWAVE-ASSISTED MAGNETIC RECORDING (MAMR-SMR)

FIELD OF THE INVENTION

The present invention relates to magnetic recording, and more particularly to write track shift control methods used in shingled-microwave-assisted magnetic recording (MAMR-SMR) and systems deploying such methodology.

BACKGROUND

Conventionally, in microwave-assisted magnetic recording (MAMR) systems, a high-frequency magnetic field is applied to a magnetic recording medium while recording to temporarily weaken the coercive force of the recording area by using the resonance phenomenon of the medium. This is referred to as microwave-assisted because the resonance frequency of the medium is in the microwave band. Recently, the use of a microwave magnetic field oscillation layer, referred to as a spin torque oscillator (STO), for rotating the magnetization at high speed by using spin torque has gained popularity, and MAMR has become a focus of attention. In addition, the idea of using the magnetic field of the main pole adjacent to the STO to control the direction of rotation of the oscillation has been utilized, and MAMR is becoming more and more practical.

In MAMR, the STO controls the pulsing of the oscillations by the pulsing of a bias current (on/off state function). However, the STO is not limited to this normal operating state in a hard disk drive (HDD) or other magnetic storage device which utilizes MAMR. For example, because recording on a hard disk of a HDD is particularly difficult at low temperatures, the STO may be used in the "on state" only at low temperatures. In another example, the use of the STO in the "on state" may occur only when recording errors occur during a repeated write (referred to as a "retry").

A MAMR head is a structure in which a STO is deposited in a layer on a conventional recording main pole. However, because of manufacturing errors which may occur, the position of the STO does not necessarily align with the main pole (off-alignment). Alternately, the STO is sometimes larger than the main pole. In this case, there is concern that the recording width will differ when the STO is in the on state or the off state. For example, as shown in the SEM photograph in FIG. 5, when the STO is offset to a right side with respect to the main pole, the recording width will sometimes become wider on the right side when the STO is in the on state as indicated by the bathtub curve (which is the error rate profile in a track width direction), shown in FIG. 6. As shown in FIG. 7, one reason for this phenomenon is that the recording width is determined by the STO in addition to the main pole when the STO is in the on state, in contrast to the recording width in the medium being determined by the main pole width when the STO is in the off state.

Recently, as HDDs utilizing shingled magnetic recording (SMR) systems have approached commercialization, the structures of these HDDs are based on SMR even when utilizing MAMR. When the recording width is changed as described above, one issue appears where the destruction of data in adjacent tracks occurs due to the changing recording width. In normal SMR, overwrites are conducted while the recording head is shifted by a constant track pitch. However, when the shift quantity is constant, regardless of widening of the recording width which may occur in MAMR systems, as shown in FIG. 8, the immediately preceding written data are destroyed.

Accordingly, it would be beneficial to have a MAMR-SMR system which rectifies the issues with the written data being destroyed in adjacent tracks due to recording width variations.

SUMMARY

In one embodiment, a magnetic data storage system includes a magnetic disk medium, a microwave-assisted magnetic recording (MAMR) head including a main pole adapted for recording data to the magnetic disk medium, the main pole having a first recording width, a spin torque oscillator (STO) positioned near the main pole, the STO being adapted to apply a high-frequency magnetic field to the magnetic disk medium during a recording operation, wherein the STO is inoperable when in an off state and operable when in an on state, a drive mechanism for passing the magnetic disk medium over the MAMR head, a read head including a magnetoresistance sensor, and a controller electrically coupled to the MAMR head for controlling operation of the MAMR head, wherein the main pole has a second recording width when the STO is in the on state, the second recording width being different from the first recording width, and wherein the controller is adapted for adjusting a shift quantity of the magnetic head depending on whether the STO is in the on state or the off state.

In another embodiment, a system includes a MAMR head having a STO adapted to apply a high-frequency magnetic field to a magnetic disk medium during a recording operation, wherein the STO is inoperable when in an off state and operable when in an on state, and a controller electrically coupled to the MAMR head for controlling operation of the MAMR head, wherein a first recording width is achieved when the STO is in the off state, a second recording width is achieved when the STO is in the on state, the second recording width being greater than the first recording width, and the controller is adapted for adjusting a shift quantity of the magnetic head depending on whether the STO is in the on state or the off state.

According to yet another embodiment, a method for controlling shingled microwave-assisted magnetic recording (MAMR-SMR) includes positioning a MAMR head over a track of a magnetic disk medium to be written, the MAMR head having a STO adapted for applying a high-frequency magnetic field to the magnetic disk medium during a recording operation, wherein the STO is operable when in an on state and is inoperable when in an off state and the MAMR head has a first recording width when the STO is in the off state, adjusting a position of the MAMR head when the STO is in the on state, and writing the track after adjusting the position of the MAMR head to account for a second recording width of the MAMR head that occurs when the STO is in the on state.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

Figure 1:
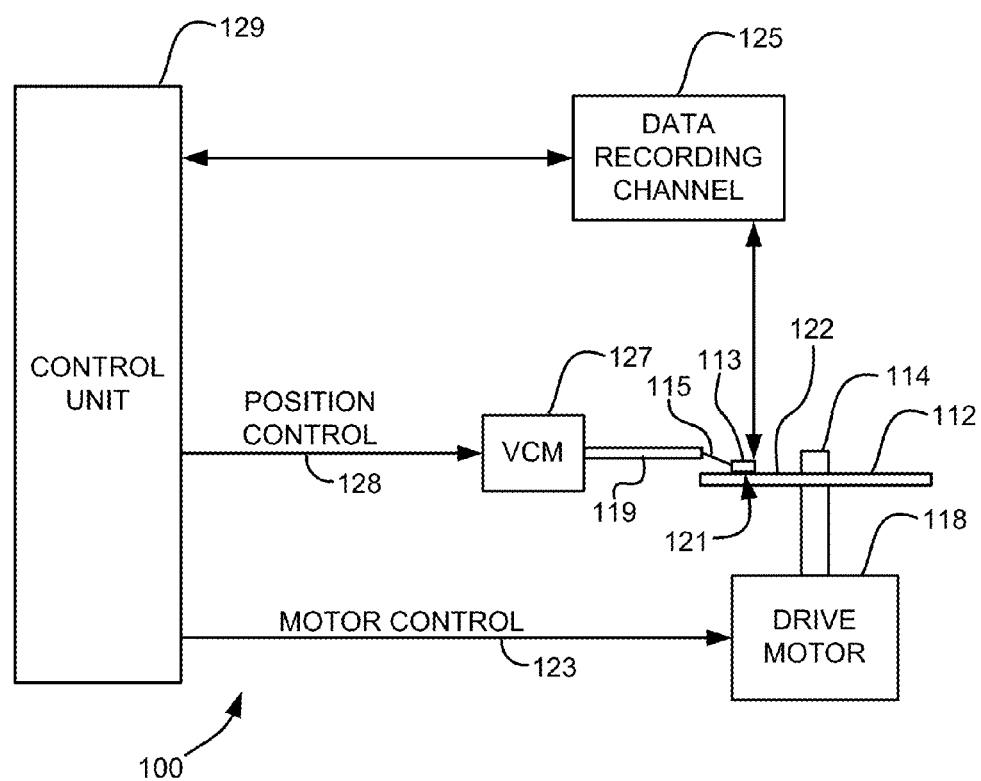
FIG. 1 is a simplified drawing of a magnetic recording disk drive system.
Figure 5:
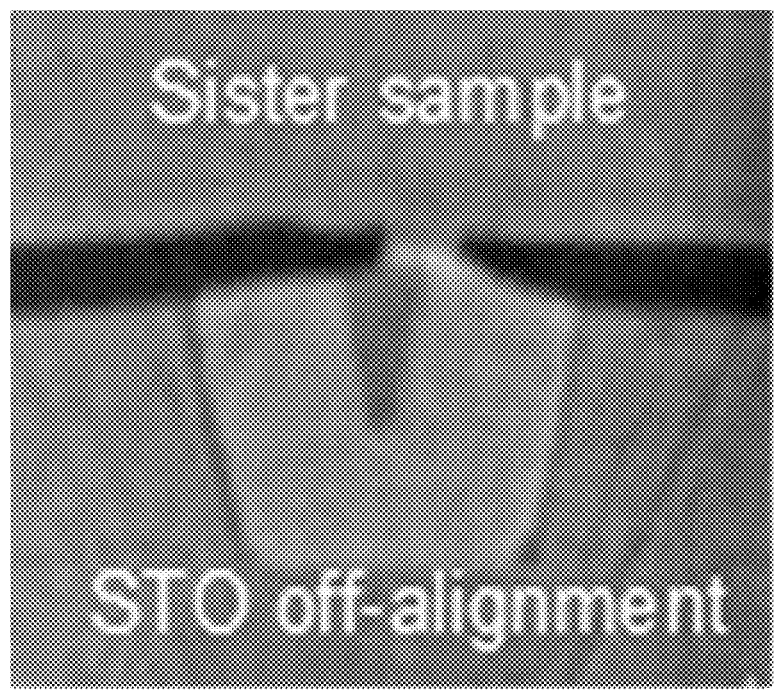
FIG. 5 shows a scanning electron microscope image of a front end of a microwave-assisted magnetic recording (MAMR) head showing off-alignment.
Figure 6:
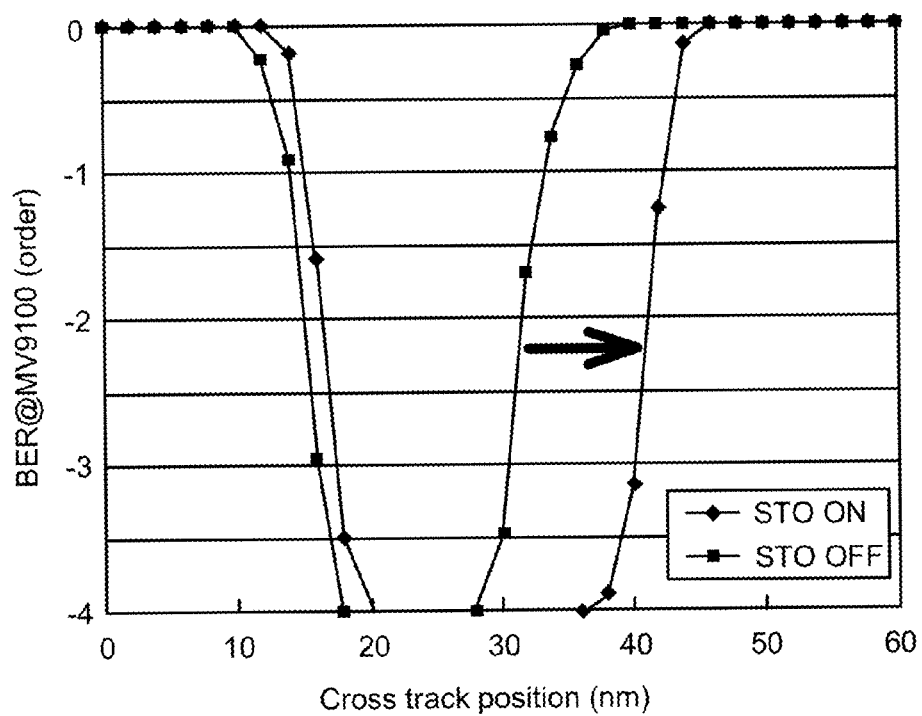
FIG. 6 shows an example of a bathtub curve showing the error rate in a track width direction.
Figure 7:
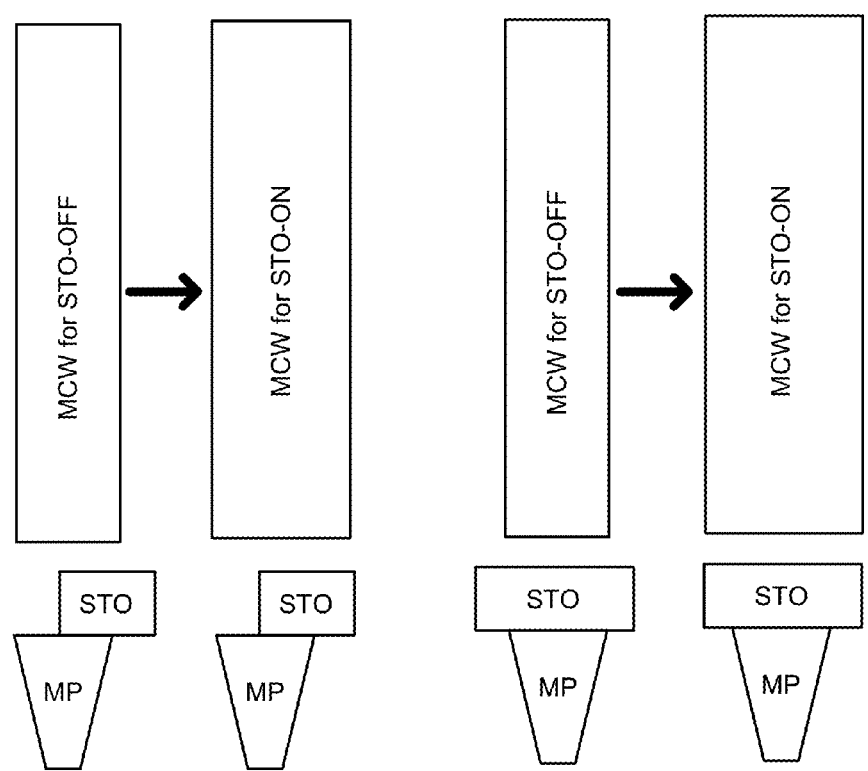
FIG. 7 shows changes in the recording width of a MAMR head that coincide with on and off states of a spin torque oscillator (STO).
Figure 8:
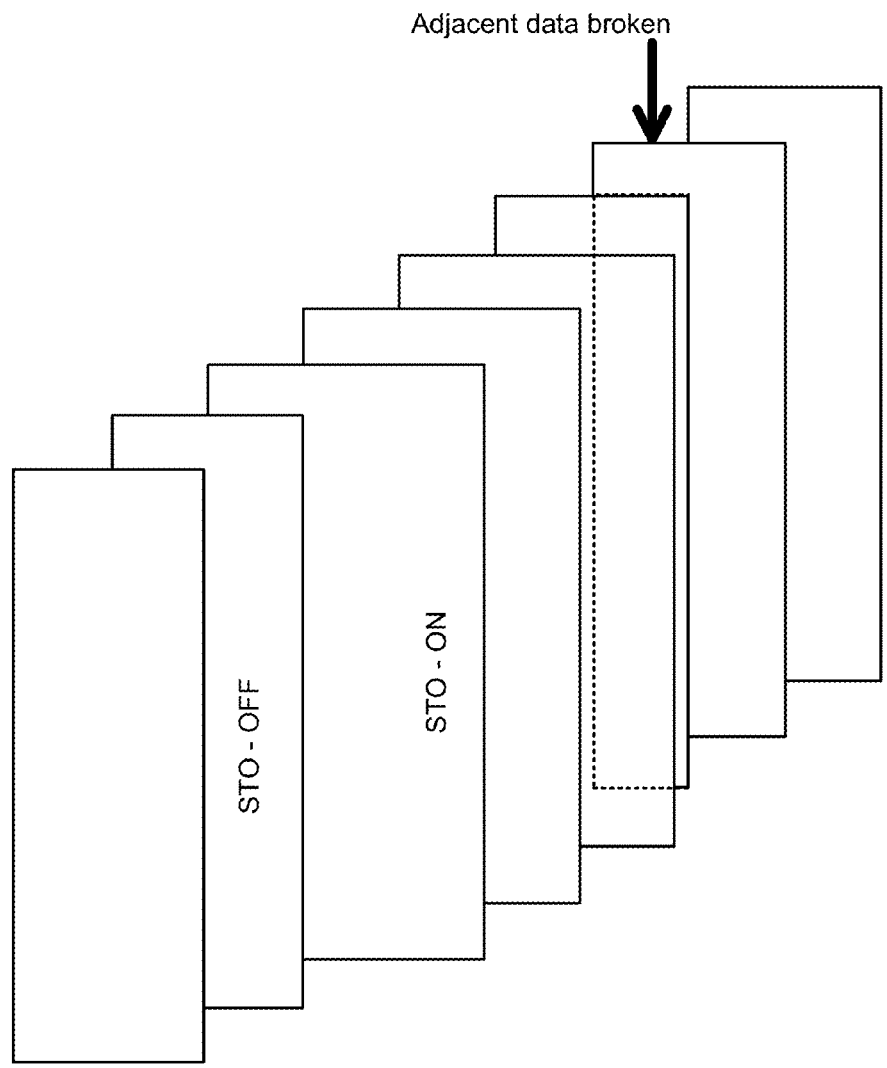
FIG. 8 is an example of destruction of data in immediately preceding recording tracks in a shingled magnetic recording (SMR) system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic data storage system includes a magnetic disk medium, a microwave-assisted magnetic recording (MAMR) head including a main pole adapted for recording data to the magnetic disk medium, the main pole having a first recording width, a spin torque oscillator (STO) positioned near the main pole, the STO being adapted to apply a high-frequency magnetic field to the magnetic disk medium during a recording operation, wherein the STO is inoperable when in an off state and operable when in an on state, a drive mechanism for passing the magnetic disk medium over the MAMR head, a read head including a magnetoresistance sensor, and a controller electrically coupled to the MAMR head for controlling operation of the MAMR head, wherein the main pole has a second recording width when the STO is in the on state, the second recording width being different from the first recording width, and wherein the controller is adapted for adjusting a shift quantity of the magnetic head depending on whether the STO is in the on state or the off state.

In another general embodiment, a system includes a MAMR head having a STO adapted to apply a high-frequency magnetic field to a magnetic disk medium during a recording operation, wherein the STO is inoperable when in an off state and operable when in an on state, and a controller electrically coupled to the MAMR head for controlling operation of the MAMR head, wherein a first recording width is achieved when the STO is in the off state, a second recording width is achieved when the STO is in the on state, the second recording width being greater than the first recording width, and the controller is adapted for adjusting a shift quantity of the magnetic head depending on whether the STO is in the on state or the off state.

According to yet another general embodiment, a method for controlling shingled microwave-assisted magnetic recording (MAMR-SMR) includes positioning a MAMR head over a track of a magnetic disk medium to be written, the MAMR head having a STO adapted for applying a high-frequency magnetic field to the magnetic disk medium during a recording operation, wherein the STO is operable when in an on state and is inoperable when in an off state and the MAMR head has a first recording width when the STO is in the off state, adjusting a position of the MAMR head when the STO is in the on state, and writing the track after adjusting the position of the MAMR head to account for a second recording width of the MAMR head that occurs when the STO is in the on state.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121, also referred to as reproducing heads and/or recording heads. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

In order to prevent data destruction that occurs due to recording width variations during on and off states of a spin torque oscillator (STO), as described in the background section, the differences in the recording width caused when the STO is on or off may be measured prior to use of the magnetic head. In one embodiment, these differences may be measured in advance during the hard disk drive (HDD) manufacturing process. In one embodiment, the recording width may become wider when the STO is in the on state. In another embodiment, the recording width may become narrower when the STO is in the on state. Accordingly, the STO may cause the recording width to become wider or narrower when in the on state.

Figure 9:
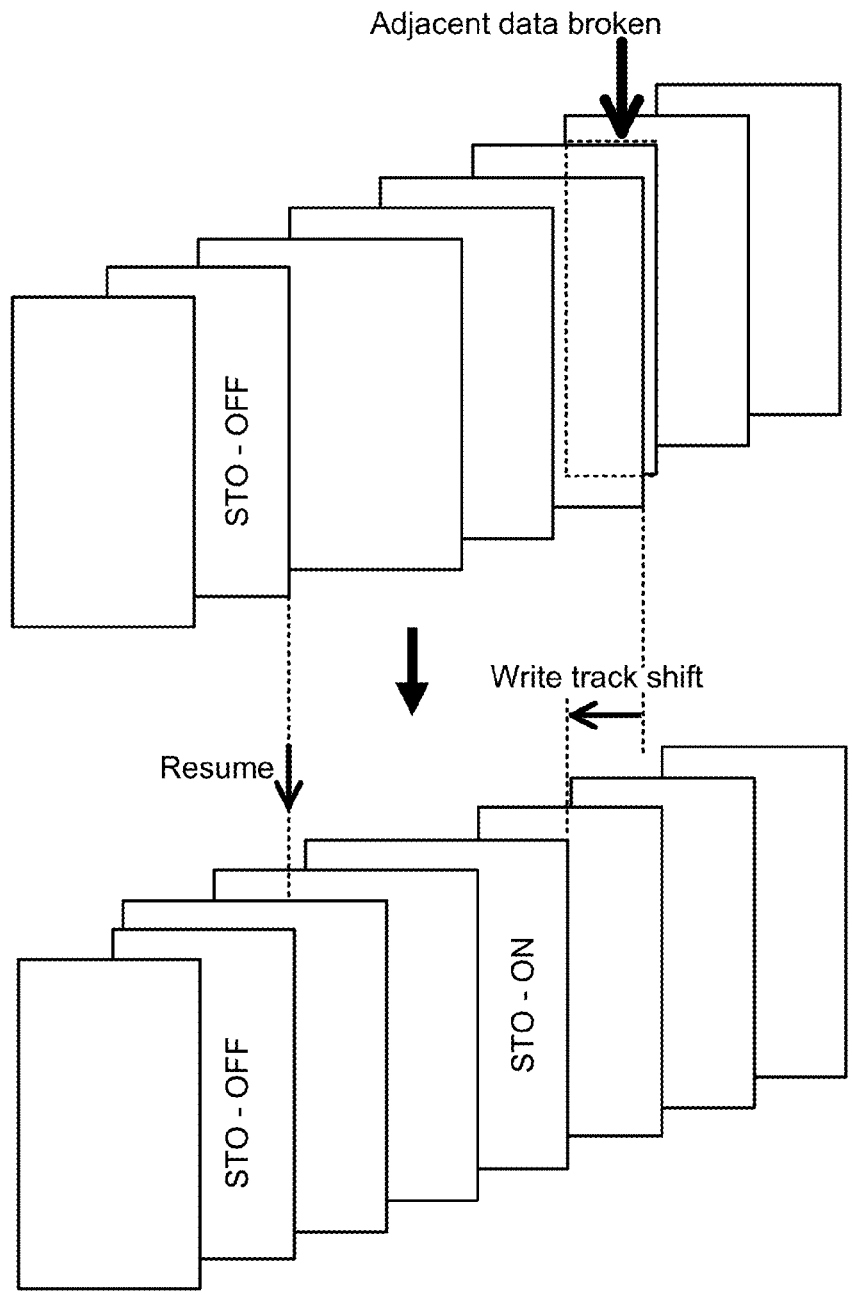
FIG. 9 is a simplified diagram of a recording head position to coincide with on and off states of a STO, according to one embodiment.

As shown in FIG. 9, the position of the recording head may be controlled in order to match the on state or off state of the STO. Specifically, the control may increase or decrease a shift quantity of the recording head by an amount of enlargement or reduction of the recording head when the recording width widens or narrows due to the STO being in the on state, and the recording width may be returned to an original value and the shift quantity may be returned to an original value when the STO is returned to the off state.

According to one embodiment, when the recording width widens due to the STO being in the on state, the control may increase the shift quantity of the recording head by an amount of enlargement of the recording head to account for this wider recording width. According to an alternate embodiment, when the recording width narrows due to the STO being in the on state, the control may decrease the shift quantity of the recording head by an amount of reduction of the recording head to account for this narrower recording width.

According to various embodiments, in a HDD system, the offset quantities, e.g., the read/write (RW)-offsets, of a recording head with respect to the read head may be measured at all of the radial positions of the disk medium in advance of use of the HDD, such as during the manufacturing process. In one approach, a table or some other suitable storage construct may be used to store the RW-offset measurements in a memory local to the HDD. When MAMR is adopted, two RW-offset tables may be created, one for the STO on state and one for the STO off state. Furthermore, which of the RW-offset tables is being utilized may be switched according to the turning on and off of the STO.

This type of control may prevent data destruction when MAMR is used in a SMR-type HDD. For example, in the HDD manufacturing process, the off-state RW-offsets (which may be referred to as RW01) may be measured at each radial position, as a normal value in the STO off state, and may be used to create a first table (which may be referred to as Table 1). Next, the on-state RW-offsets (which may be referred to as RW02) are similarly measured when the STO is in the on state and may be used to create a second table (which may be referred to as Table 2). Of course, in some embodiments, the offsets may be stored to a single table in different columns or rows. In any case, the information in tabular form may be stored in an appropriate memory region of the HDD for access during use.

When a HDD is used, a RW01 value from the Table 1 may be used to position the recording head when the STO is in the off state. When the STO is transitioned to the on state, a RW02 value may be read from Table 2 to position the recording head. By using this operation, when the STO switches on or off, the recording position is shifted by only the difference between the offset quantities (RW01-RW02), which is referred to as a shift quantity, and the already written adjacent tracks may be preserved and not destroyed due to head positioning variations. The shift quantity is typically in a cross-track direction to account for head misalignment due to cross-track recording width variation.

In one approach, the controller may be adapted for adjusting a shift quantity of the magnetic head depending on whether the STO is in the on state or the off state. According to one approach, the controller may comprise logic adapted for positioning the MAMR head over a track of a magnetic disk medium to be written, logic adapted for adjusting a position of the MAMR head when the STO is in the on state, and logic adapted for writing the track after adjusting the position of the MAMR head to account for a second recording width of the MAMR head that occurs when the STO is in the on state. The different recording width when the STO is in the on state may be wider or narrower from the original recording width.

Figure 10:
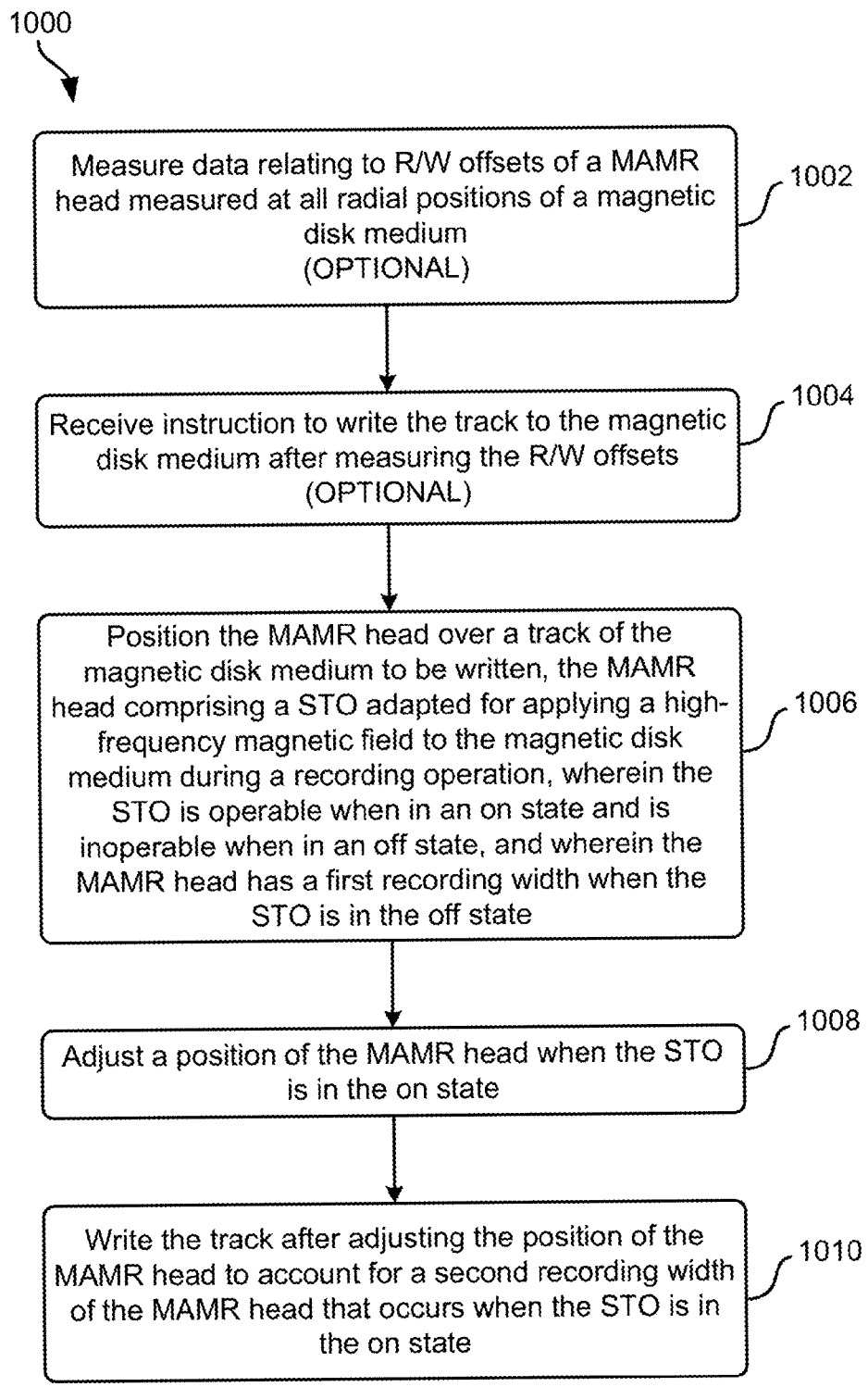
FIG. 10 is a flowchart of a method, according to one embodiment.

FIG. 10 shows a method 1000 for controlling MAMR-SMR, in accordance with one embodiment. As an option, the present method 1000 may be implemented in any environment, such as those shown in FIGS. 1-9. Of course, this method 1000 and others presented herein may be used with a wide variety of devices and/or purposes which may or may not be related to magnetic recording. It should also be noted that any aforementioned features may be used in any of the embodiments described in accordance with the various methods.

In optional operation 1002, data is measured relating to R/W offsets of the MAMR head measured at all radial positions of the magnetic disk medium. Any method of measuring the R/W offsets may be used that are known in the art. In one approach, the R/W offsets may be used to determine the shift quantity.

In one approach, the data may be stored to a memory of a disk drive such that it may be accessed at a later time to aid in positioning of the MAMR head during write operations.

In optional operation 1004, instruction to write the track to the magnetic disk medium is received after measuring the R/W offsets. This instruction may be generated by a controller adapted for controlling the MAMR head, in one approach.

In operation 1006, a MAMR head is positioned over a track of a magnetic disk medium to be written, the MAMR head comprising a STO adapted for applying a high-frequency magnetic field to the magnetic disk medium during a recording operation. The STO is operable when in an on state and is inoperable when in an off state, and the MAMR head has a first recording width when the STO is in the off state.

In operation 1008, a position of the MAMR head is adjusted when the STO is in the on state. In this way, any head misalignment which may occur due to the STO being in the on state may be offset. The amount of adjustment may be related to a shift quantity, which may be a difference between measurements of head position taken when the STO is in the on state versus when the STO is in the off state.

In operation 1010, the track is written after adjusting the position of the MAMR head to account for a second recording width of the MAMR head that occurs when the STO is in the on state In one approach, the second recording width is different from the first recording width, due to either expansion or contraction caused by the STO. What is meant by different from is either wider or marrower.

According to another embodiment, the R/W offsets may be measured between the MAMR head and a read head prior to use of the MAMR head for storing data, such as during manufacture of a magnetic storage device having the MAMR head.

In yet another embodiment, a portion of the R/W offsets measured when the STO was in the off state and a portion of the R/W offsets measured when the STO was in the on state may be stored in a memory. In a further approach, these offsets may be stored in one or more tables in order to enable on demand access to the offsets during subsequent writing operations.

For example, in one embodiment, the R/W offsets measured when the STO was in the off state may be used to position the MAMR head when the STO is in the off state, while the R/W offsets measured when the STO was in the on state may be used to position the MAMR head when the STO is in the on state.

Of course, the method 1000 may be used in any systems or computer program products, including any embodiments and/or descriptions provided herein. For example, in one embodiment, a magnetic data storage system comprises a magnetic disk medium, a MAMR head having a main pole adapted for recording data to the magnetic disk medium, the main pole having a first recording width, a STO positioned near the main pole (such as near a leading edge of the main pole, a trailing edge of the main pole, etc.), the STO being adapted to apply a high-frequency magnetic field to the magnetic disk medium during a recording operation, wherein the STO is inoperable when in an off state and operable when in an on state, wherein the main pole has a second recording width when the STO is in the on state, the second recording width being greater than the first recording width. The system also includes a drive mechanism for passing the magnetic disk medium over the MAMR head, a read head comprising a magnetoresistance sensor, and a controller electrically coupled to the MAMR head for controlling operation of the MAMR head, wherein the controller is adapted for adjusting a shift quantity of the magnetic head depending on whether the STO is in the on state or the off state.

In various embodiments, a memory having data relating to R/W offsets of the MAMR head measured at all radial positions of the magnetic disk medium may be included in the system, the R/W offsets may be measured between the MAMR head and the read head, a portion of the R/W offsets measured when the STO was in the off state are stored in a first table, and a portion of the R/W offsets measured when the STO was in the on state may be stored in a second table in the memory, and/or the controller may be adapted for using the R/W offsets from the first table to position the MAMR head when the STO is in the off state, and the controller may be adapted for using the R/W offsets from the second table to position the MAMR head when the STO is in the on state.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic data storage system, comprising:
a magnetic disk medium;
a microwave-assisted magnetic recording (MAMR) head, comprising:
a main pole adapted for recording data to the magnetic disk medium, the main pole having a first recording width;
a spin torque oscillator (STO) positioned near the main pole, the STO being adapted to apply a high-frequency magnetic field to the magnetic disk medium during a recording operation, wherein the STO is inoperable when in an off state and operable when in an on state;
wherein the main pole has a second recording width when the STO is in the on state, the second recording width being different from the first recording width;
a drive mechanism for passing the magnetic disk medium over the MAMR head;
a read head comprising a magnetoresistance sensor; and
a controller electrically coupled to the MAMR head for controlling operation of the MAMR head, wherein the controller is adapted for adjusting a shift quantity of the magnetic head depending on whether the STO is in the on state or the off state.

2. The magnetic data storage system as recited in claim 1, further comprising a memory having data relating to read/write (R/W) offsets of the MAMR head measured at all radial positions of the magnetic disk medium stored thereto, wherein the R/W offsets are used to determine the shift quantity.

3. The magnetic data storage system as recited in claim 2, wherein the R/W offsets are measured between the MAMR head and the read head.

4. The magnetic data storage system as recited in claim 2, wherein a portion of the R/W offsets measured when the STO was in the off state are stored in a first table, and wherein a portion of the R/W offsets measured when the STO was in the on state are stored in a second table in the memory.

5. The magnetic data storage system as recited in claim 4, wherein the controller is adapted for using the R/W offsets from the first table to position the MAMR head when the STO is in the off state, and wherein the controller is adapted for using the R/W offsets from the second table to position the MAMR head when the STO is in the on state.

6. The magnetic data storage system as recited in claim 1, wherein the controller comprises:
logic adapted for positioning the MAMR head over a track of a magnetic disk medium to be written;
logic adapted for adjusting a position of the MAMR head when the STO is in the on state; and
logic adapted for writing the track after adjusting the position of the MAMR head to account for a second recording width of the MAMR head that occurs when the STO is in the on state.

7. A system, comprising:
a microwave-assisted magnetic recording (MAMR) head, comprising:
a spin torque oscillator (STO) adapted to apply a high-frequency magnetic field to a magnetic disk medium during a recording operation, wherein the STO is inoperable when in an off state and operable when in an on state;
wherein a first recording width is achieved when the STO is in the off state, and wherein a second recording width is achieved when the STO is in the on state, the second recording width being greater than the first recording width; and a controller electrically coupled to the MAMR head for controlling operation of the MAMR head, wherein the controller is adapted for adjusting a shift quantity of the magnetic head depending on whether the STO is in the on state or the off state.

8. The system as recited in claim 7, further comprising a memory having data stored thereto, the data relating to read/write (R/W) offsets of the MAMR head measured at all radial positions of the magnetic disk medium, wherein the R/W offsets are used to determine the shift quantity.

9. The system as recited in claim 8, wherein the R/W offsets are measured between the MAMR head and a read head.

10. The system as recited in claim 8, wherein a portion of the R/W offsets measured when the STO was in the off state and a portion of the R/W offsets measured when the STO was in the on state are stored in the memory.

11. The system as recited in claim 10, wherein the controller is adapted for using the R/W offsets measured when the STO was in the off state to position the MAMR head when the STO is in the off state, and wherein the controller is adapted for using the R/W offsets measured when the STO was in the on state to position the MAMR head when the STO is in the on state.

12. A method for controlling shingled microwave-assisted magnetic recording (MAMR-SMR), the method comprising:
positioning a MAMR head over a track of a magnetic disk medium to be written, the MAMR head comprising a spin torque oscillator (STO) adapted for applying a high-frequency magnetic field to the magnetic disk medium during a recording operation, wherein the STO is operable when in an on state and is inoperable when in an off state, and wherein the MAMR head has a first recording width when the STO is in the off state;

adjusting a position of the MAMR head when the STO is in the on state; and writing the track after adjusting the position of the MAMR head to account for a second recording width of the MAMR head that occurs when the STO is in the on state.

13. The method as recited in claim 12, wherein the second recording width is different from the first recording width.

14. The method as recited in claim 12, further comprising:
measuring data relating to read/write (R/W) offsets of the MAMR head measured at all radial positions of the magnetic disk medium; and receiving instruction to write the track to the magnetic disk medium after measuring the R/W offsets.

15. The method as recited in claim 14, wherein the R/W offsets are measured between the MAMR head and a read head.

16. The method as recited in claim 14, wherein a portion of the R/W offsets measured when the STO was in the off state and a portion of the R/W offsets measured when the STO was in the on state are stored in a memory.

17. The method as recited in claim 14, further comprising:
using the R/W offsets measured when the STO was in the off state to position the MAMR head when the STO is in the off state; and using the R/W offsets measured when the STO was in the on state to position the MAMR head when the STO is in the on state.

* * * * *